United States Patent [19]

Olsson

[11] Patent Number: 4,467,657
[45] Date of Patent: Aug. 28, 1984

[54] DEVICE FOR MEASURING THE AMOUNT OF FLOW AND/OR THE SPEED OF FLOW OF A MEDIUM

[75] Inventor: Bengt Olsson, Kungsbacka, Sweden

[73] Assignee: Telfa Jabsco AB, Gothenburg, Sweden

[21] Appl. No.: 346,058

[22] PCT Filed: May 22, 1980

[86] PCT No.: PCT/SE80/00149
§ 371 Date: Jan. 20, 1982
§ 102(e) Date: Jan. 20, 1982

[87] PCT Pub. No.: WO81/03379
PCT Pub. Date: Nov. 26, 1981

[51] Int. Cl.³ ............................................. G01F 1/00
[52] U.S. Cl. ........................................ 73/861; 73/3; 377/21; 417/63
[58] Field of Search ................ 73/861, 861.77, 861.78, 73/3, 861.03; 364/510; 377/21; 222/14, 23, 71; 417/63

[56] References Cited

U.S. PATENT DOCUMENTS 3,873,814  3/1975  Mirdadian .................... 73/861.77 X
4,331,262  5/1982  Snyder et al. .................... 73/168 X

FOREIGN PATENT DOCUMENTS 1159654  12/1963  Fed. Rep. of Germany ... 73/861.77

Primary Examiner—Charles A. Ruehl

[57] ABSTRACT

A device for measuring the amount flowing through and/or the speed of flow of a medium which is pumped by means of a pump unit. The device comprises a drive motor for producing the working cycles of the pump unit and a pick-off to detect said working cycles and to deliver a pick-off signal depending on said working cycles. Further included is an electronic unit (10) to record, by means of said pick-off signal, a value proportional to the number of working cycles. From this value, the amount flowing through and/or the speed of flow can be determined by means of a nominal calibrating factor $K_N$ laid down for the pump unit. The electronic unit 10 includes a calibrating unit 11 which is adjustable to convert said pick-off signal into at least one output signal which represents a certain true calibrating factor $K_V$, calculated with reference to a specific correction factor $K_K$ for correction of the nominal calibrating factor $K_N$. Further included are devices 12–15 for recording the amount and/or speed of flow of the medium flowing through, adapted to be controlled by the output signal from the calibrating unit.

8 Claims, 9 Drawing Figures

DEVICE FOR MEASURING THE AMOUNT OF FLOW AND/OR THE SPEED OF FLOW OF A MEDIUM

Technical field

The present invention relates to a device for measuring the amount of flow and/or the speed of flow of a medium which is pumped by means of a pump unit, which device comprises a drive motor to cause working cycles of the pump unit, a pick-off for detecting said working cycles and transmitting a pick-off signal depending on said working cycles, an electronic unit to record, by means of said pick-off signal, a value proportional to the number of working cycles from which value the amount flowing through and/or the speed of flow can be determined by means of a nominal calibration factor fixed for the pump unit.

Background art

The measuring of the amount and/or the speed of flow in a medium which is pumped in a conduit hitherto had to be effected by means of separate flowmeters when it was necessary to meet strict requirements with regard to the measuring accuracy. In this case, these flowmeters are coupled into the conduit in series with a necessary pump unit. Such flowmeters are very expensive since they usually involve a high cost price and entail a complicated and expensive installation as well as requiring a great deal of service. It is also known, however, to measure the amount flowing through and the speed of flow of a medium by measuring the pump movements carried out starting from given pump data, which is possible with pumps of the so-called displacement type, such as gear pumps, impeller pumps and the like. With pumps of the rotating type, this is effected by means of a pick-off which is mounted on the pump shaft and which is adapted to deliver a signal depending on the rotation of the pump shaft, that is to say the number of revolutions effected or the speed of rotation of the shaft. Guided by nominal data for the pump in question, that is to say specified amounts per revolution according to the manufacturing data, the amount pumped or the speed of flow can thus be measured and utilized to control the drive motor of the pump, that is to say the stop function in a proportioning pump or control of the number of revolutions per minute.

The technical problem:

Nevertheless it has been found that a satisfactory measuring accuracy could not be achieved by the technique hitherto known, because nominal pump data do not coincide with actual data for the pump with regard to the amount pumped per revolution due to the fact that this value is influenced by a number of parameters which vary from case to case. Thus considerable errors appear in this approximate measurement, caused, inter alia, by the pressure in the conduit, the viscosity of the pumped medium, and wear in the pump unit.

The object of the present invention is to improve the last-mentioned type of measuring technique so as to obtain a satisfactory measuring accuracy.

The solution:

Said object is achieved by means of a device according to the invention which is characterized in that the electronic unit includes on the one hand a calibrating unit which can be adjusted to convert said pick-off signal into at least one ouput signal which represents a certain true calibration factor, calculated on the basis of a certain correction factor for correction of the nominal calibration factor, and on the other hand devices for recording the amount and/or speed of flow of the medium flowing through, adapted to be controlled by the output signal from the calibrating unit.

Brief description of drawings:

The invention will be described in more detail below with an example of embodiment with reference to the accompanying drawings in which.

Figure 1:
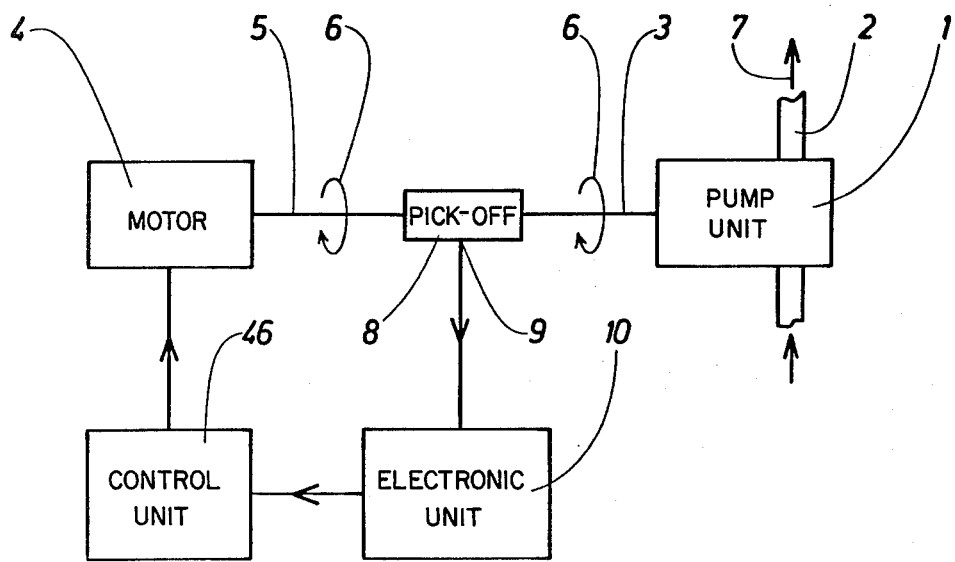
FIG. 1 shows diagrammatically a pump unit with a measuring and control device according to the invention.

Best mode of carrying out the invention:

FIG. 1 shows that the device according to the invention is composed of a pump unit 1 which is adapted to pump a pumpable medium twhich various cleaning implements 16 can be positioned while not in use. The vacuum cleaner is supported on casters 18 which af particles are also conceivable in principle. The pump unit is of the displacement type, for example a gear pump or impeller pump, that is to say a type which causes transport of the medium in the conduit with a certain quantity per pump cycle. In the example shown, a pump unit of rotating type is provided, said pump cycles consisting of revolutions of the shaft 3 of the pump unit. The pump movement is brought about by means of a drive motor, in the example shown an electric motor 4 of rotating type, which is adapted to turn the pump shaft 3, with its output shaft 5, in the direction indicated by the arrow 6, which involves pumping the intended medium in the conduit 2 in a certain direction, indicated by an arrow 7. Connected to the pump shaft 3 is a pick-off 8 to detect and indicate the working cycles of the pump unit 1, in this case the revolutions executed by the pump shaft 3 and hence by the pump unit. The pick-off 8 is adapted to deliver a pick-off signal at its output 9, depending on the rotation of the pump shaft 3. This is brought about, for example, by means of a pick-off of photocell type, in which is included a disc with holes or teeth, which rotates with the pump shaft 3. The signal appearing at the output 9 of the pick-off 8 consists of a pulse train in which the number of pulses corresponds to the number of revolutions of the pump unit or a certain portion of a revolution. The pick-off 8 can actually be adapted to deliver either one or more pulses per revolution, and in the latter case, each pulse represents a certain angular interval in the pump shaft 3. As a result, the pulse train thus comes to represent a value of pumped amount which is nevertheless approximate, as will be explained in more detail below.

Further included in the device according to the invention is an electronic unit 10 which is adapted to receive the pick-off signal and a control unit 46 which is adapted to control the electric motor 4 depending on signals from the electronic unit. The control unit 46 has an engaging/disengaging function to engage and disengage the electric motor 4, that is to say to start and stop the pump unit 1 depending on the measured amount of pumped medium according to the pick-off 8. The engagement/disengagement function also activates a magnetically operated valve which is mounted in the conduit 2 after the pump unit 1. This is adapted after delay, to close the conduit when the pump unit is stopped. Further included in the control unit 46 is a speed control function with control of the number of revolutions of the electric motor depending on the number of revolutions measured per unit of time by means of the pick-off 8. Both the engagement/disengagement function and the speed control function may consist of units known per se so that these will not be described in detail. Examples of embodiment of the engagement/disengagement function and the speed control function are electro-magnetic relays or a thyristor unit.

Figure 3:
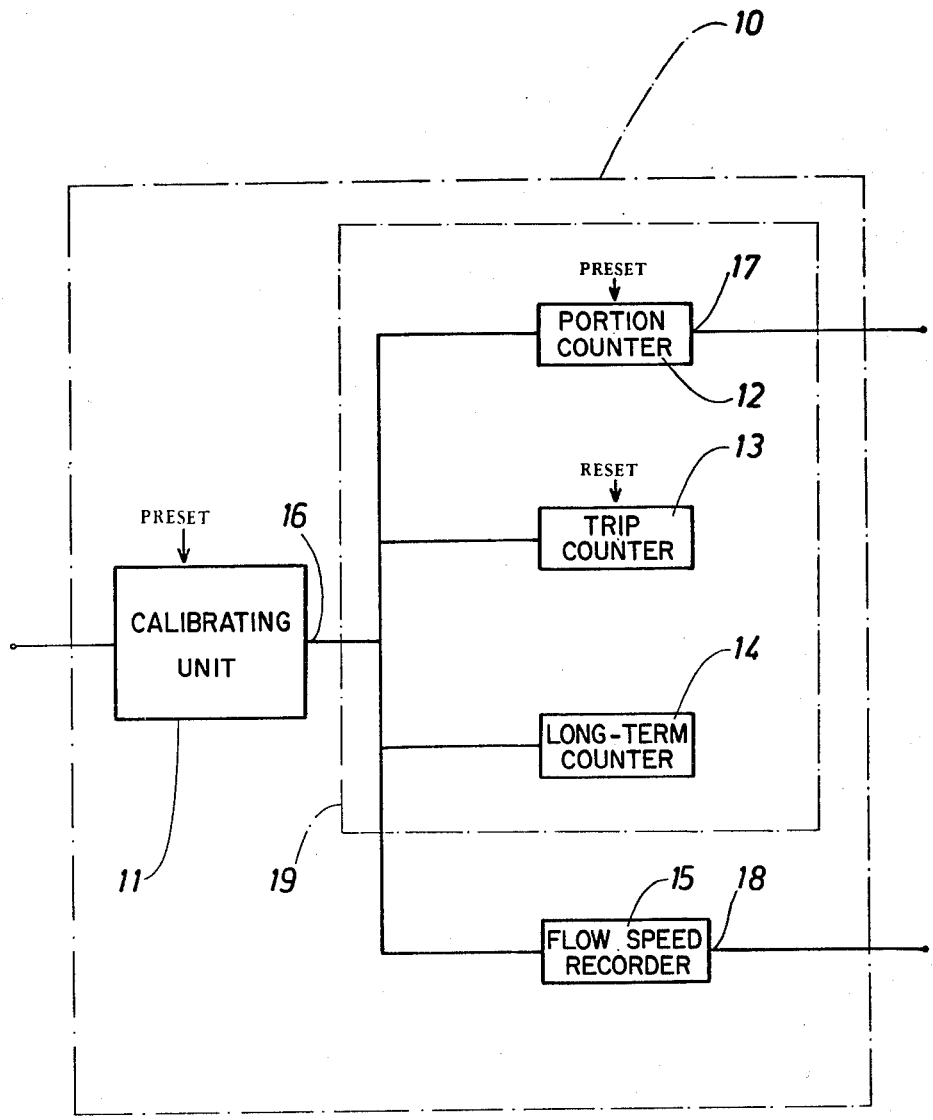
FIG. 3 shows an example of an electronic unit included in the device shown in FIG. 1.

FIG. 3 shows an example of an embodiment of the electronic unit 10 which is composed mainly of a calibrating unit 11 which is adapted to receive the pick-off signal delivered by the pick-off 8, a portion counter 12, a trip counter 13, a long-term counter 14 and a device for recording the flow speed 15. All the said units are connected to the output 16 from the calibrating unit, and the portion counter 12 is adapted to deliver, at its output 17, an output signal which can be utilized for control purposes, for example being conveyed to the control unit 46 for its engagement/disengagement function. The device for recording the flow speed 15 is adapted to record the flow speed of the pumped medium. The flow speed or more precisely the speed of the electric motor is adjusted, for example by means of a wheel for example at the device for recording the flow speed 15 in order to act on the control unit 11 for control of the electric motor 4 by means of an output signal from its output 18 in a manner known per se.

Figure 4:
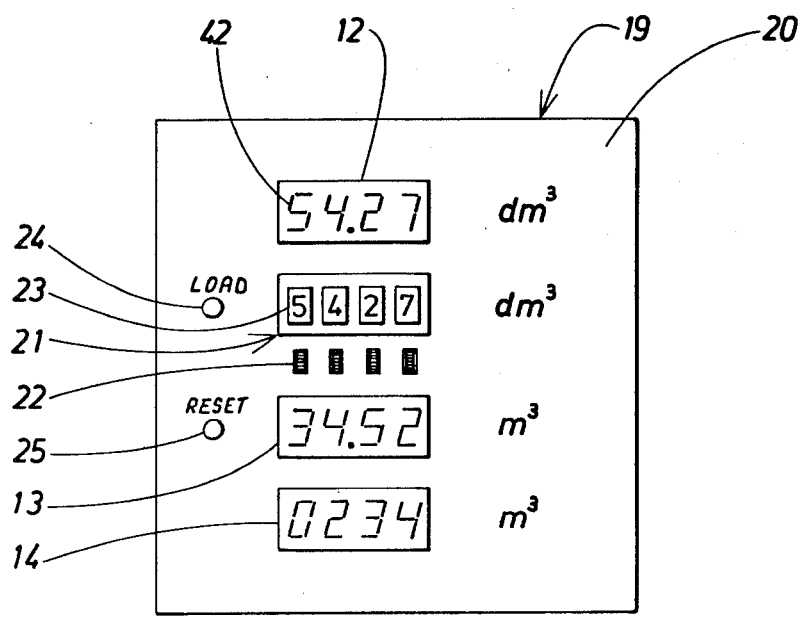
FIG. 4 shows an amount calculating unit which is included in the electronic unit shown in FIG. 3.

The portion counter 12, the trip counter 13 and the long-term counter 14 are mounted, as can best be seen from FIG. 4 but is also indicated in FIG. 3, in a common quantity calculating unit 19. As can be seen from FIG. 4, the values measured in all these counters are presented by means of numerical indicators 42 which are stepped on depending on the signal delivered by the pick-off 8 after calibration in the calibrating unit 11 which will be described in more detail below. Also on the panel 20 of the quantity calculating unit 19 is a portion adjusting unit 21 with four thumb-wheels 22 which are coupled to a digital mechanism 23. Thus by means of the adjusting unit 21, a required portion is present, that is to say the transport of a required amount of the pumped medium. On the panel 20 there is a LOAD button 24 in the form of a switch by means of which the portion counter 12 is loaded with the present portion value which then appears on the numerical indicator 42 of the portion counter 12. This counts down to zero, and successively presents the remainder of the portion during this counting down. Also provided is a RESET button 25 for the trip counter 13 which is restored by means of this to the zero position so as to be able to indicate directly the amount pumped between two different occasions, while the long-term counter 14 thus indicates the total amount pumped.

Figure 5:
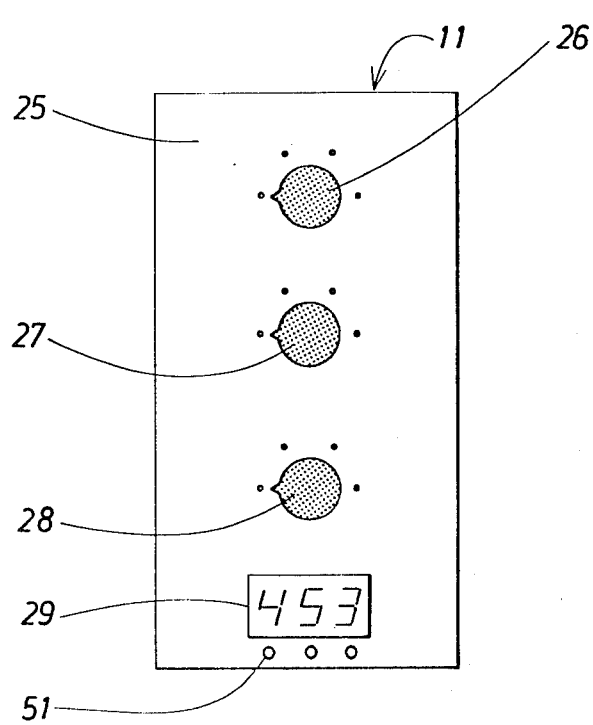
FIG. 5 shows a calibrating unit which is likewise included in the electronic unit shown in FIG. 3.

The panel 25 of the calibrating unit 11 is shown by an example in FIG. 5. This is provided with three setting members in the form of setting knobs 26, 27, 28 for setting the decimal points on the three different counters, that is to say one setting knob 26 is adapted to set the decimal point, that is to say the measuring range for the portion counter 12 and the device for recording the flow speed 15, one knob 27 for corresponding setting of the trip counter 13 and one setting knob 28 for the long-term counter 14. The knobs 26, 27, 28 are adapted to be set in four different positions each one representing one position for the decimal point in the respective unit. By means of the knob in each one of its positions, a circuit is closed to ignite a light-emitting diode segment in the form of a point in a corresponding numerical indicator 42 in the respective counter. Arranged on the panel 25 are three digit indicators 29 which show a scale factor by means of light-emitting diodes. This is adapted to present a set value of the number of $dm^3$ per pulse which is delivered from the pick-off 8 and corrected according to the invention in a manner which is described in more detail below. The scale factor is adjusted in known manner by means of push-buttons 51.

Figure 6:
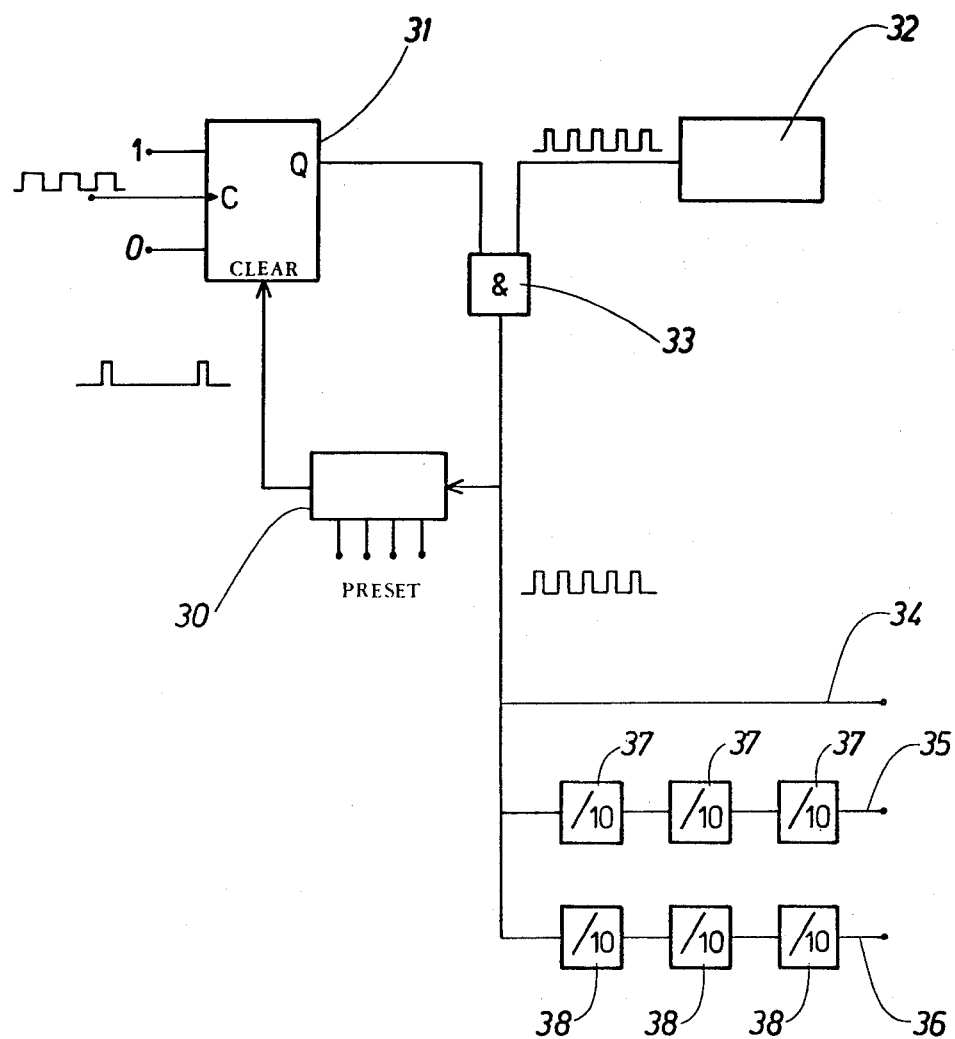
FIG. 6 shows an example of an embodiment of the calibrating unit shown in FIG. 5.

FIG. 6 shows an example of the composition of the calibrating unit 11 by means of digital components. Included in the calibrating unit is a bistable trigger 31 which may, for example, be a JK trigger of master-slave type, such as a circuit of the type SN5476. This is adapted to receive the pick-off signal at its C input, a clock signal generator 32 in the form of an oscillator, adapted to deliver a clock signal in the form of a pulse train with a suitably selected frequency, and an AND-gate 33, the two inputs of which are connected respectively to the Q output of the trigger 31 and the clock-signal generator 32. The 1-input of the trigger is connected to a reference potential, for example +5 V, while the 0-input is earthed. Also included in the calibration unit is a down-counter 30 which is adapted to count down the number of incoming pulses from a preset value, which corresponds to the scale factor, that is to say the number of liters per pulse from the pick-off 8. The down-counter 30 is connected on the one hand to the output of the AND-gate 33 and on the other hand to a zero-setting input of the trigger 31, designated by CLEAR, for setting the trigger 31 to zero when the counter 30 has counted down to zero. As a result, for each pulse which is delivered from the pick-off 8, a pulse train appears at the output of the AND-gate 33 with a number of pulses which corresponds to the preset value on the scale factor. The calibrating unit has three outputs 34, 35, 36. Said pulse train is conveyed to the first output 34 without treatment, while before the outputs 35 and 36, the pulse train is divided by means of three frequency dividers 37, 38. By said division of the frequency by ten in each frequency divider 37, 38 in the calibrating unit 11, a conversion of liters into cubic meters is obtained.

Figure 7:
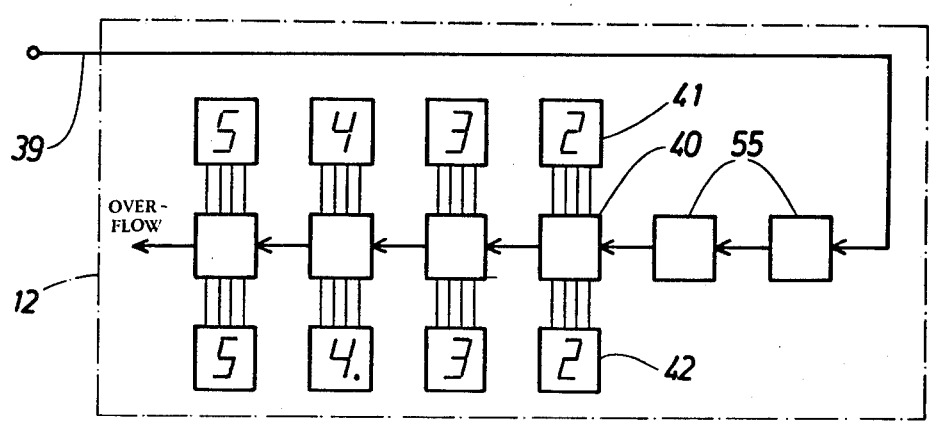
FIGS. 7-9 show examples of embodiments of various counters included in the calculating unit shown in FIG. 4.
Figure 8:
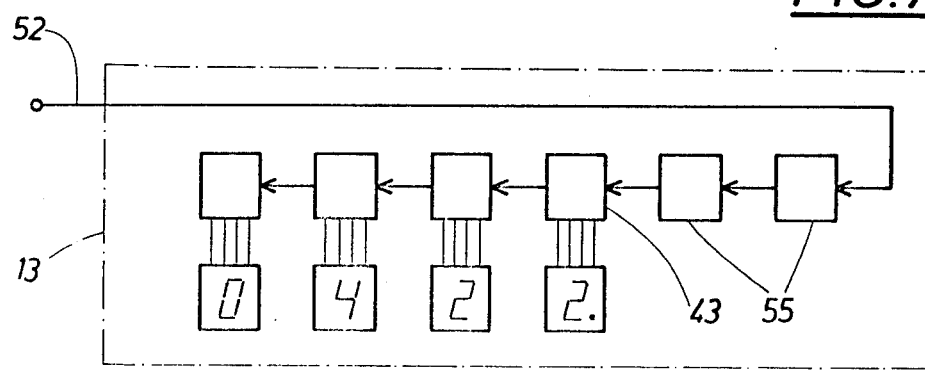

FIG. 7 shows an example of the composition of the portion counter 12, while FIG. 8 shows an example of the composition of the trip counter 13. The long-term counter 14 can be constructed in the same manner as the trip counter so that it is not shown. The portion counter 12 comprises an input 39 which is connected to the first output 34 from the calibration unit 11 and comprises a number of down-counters 40 which are coupled in cascade and which are charged with a value preset by means of the thumbwheels 22 on the panel 20 of the portion counter 19. The preset values are presented by means of the numerical indicators 41 which thus correspond, after the charging but before the start of the pump unit, to the numerical setting according to the adjusting unit 21 in FIG. 4. The down-counters 40 which consist of decade counters, are thus adapted to record the number of incoming pulses and to count down from the preset value to zero, indicating by means of the numerical indicators 42 which are also shown in FIG. 4. The digital representation is brought about in known manner by means of so-called NBCD seven segments decoder for converting NBCD code for control of the digital indicators of the seven segments. In this manner, the various digits can be built up from seven light-emitting diode segments. The trip counter 13 is composed of a number of counters 43 which are coupled in cascade and which in this unit, however, are adapted to record the number of incoming pulses by counting upwards from the zero position. The input of the trip counter 52 is connected to the second output 35 of the calibrating unit, while its third output 36 is connected to the input of the long-term counter. As can be seen from FIGS. 7 and 8 (and also FIG. 9), each counter unit comprises a number of counters 55, 56, the counting position of which is not presented by means of any numerical indicator because the device has a greater internal accuracy than is necessary in practice.

Figure 9:
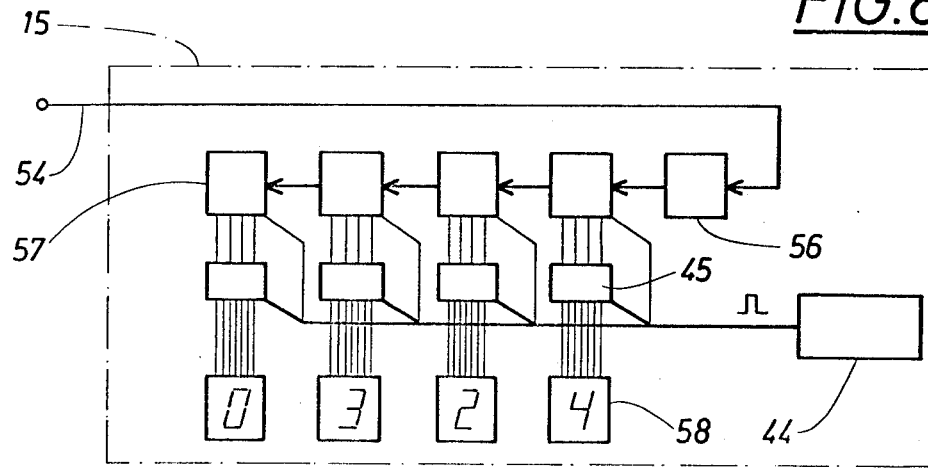

FIG. 9 shows an example of the composition of the device 15 for recording the flow speed. This comprises an input 54 which is connected to the first input 34 of the calibrating unit 11 and five upward-counting decade counters 56, 57, which are coupled in cascade and of which four are each connected to their own numerical indicator 58 via registers 45. These are connected to a timer unit 44 which is adapted to deliver a pulse, for example every 60th second, to each register and after a very short delay of for example a few microparts of a second, also to each counter 57 to set these to zero. Thus at the input there appears the pulse train which is delivered from the calibrating unit for each incoming pulse from the pick-off 8. The pulses in the pulse train are counted by each decade counter 56, 57 in cascade transferring the counter position to the associated register which serves as a locking circuit. This is opened at uniform intervals, in this case every 60th second, by the pulses from the timer unit 44, whereupon the information in the register is transferred to the associated numerical indicator 58 while at the same time the counters are set to zero. By this means a presentation of the amount per unit of time, in this case liters/minute, that is to say the flow speed, is obtained in a simple manner.

The device according to the invention is calibrated in the following manner. The adjustment of the above-mentioned scale factor, that is to say the number of dm$^3$ per pulse from the pick-off 8 is brought about with reference to the following calculation. Each pump unit has a nominal value $K_N$ for the calibrating factor which forms the starting point when the scale factor is selected. If it is assumed that the pump unit pumps 0.0143 dm$^3$ per revolution, the nominal calibrating factor is then $K_N = 0.0143 = 1.43 \cdot 10^{-2}$ dm$^3$/ revolution With the pump unit coupled into the actual conduit 2, the value for the nominal calibrating factor $K_N$ is adjusted at the calibrating unit 11. In this case, the pick-off 8 is actually adapted to deliver one pulse per revolution. A certain portion amount, for example 5.00 dm$^3$ is adjusted at the proportioning unit 19 by means of the thumb-wheels 22 after which the LOAD button 24 is pressed in and the pump unit started. An output signal is then delivered from the calibrating unit 11 at the output 34 in the form of a pulse train which comprises, for each pulse in the pick-off signal, a number of pulses corresponding to the numerical value for the nominal calibrating factor. Then a control measurement is made of the amount actually flowing through the pump unit 1, the medium flowing through being taken out, for example, via a side pipe at the outlet of the pump unit and measured for example by means of a volume meter, the conduit 2 being kept shut by means of a valve connected to said outlet. With a starting point from the actual amount flowing through, which may have proved to be 4.82 dm$^3$ during the control measurement, a correction factor $K_K$ is calculated $$K_K = \frac{4.82}{5.00} = 0.964$$

By multiplying the nominal calibrating factor $K_N$ by the correction factor $K_K$, the true calibrating factor $K_V$ is obtained.

$$K_V = \frac{4.82}{5.00} \cdot 1.43 \cdot 10^{-2} = 1.33 \cdot 10^{-2} \text{ dm}^3/\text{revolution}$$

This true calibrating factor $K_V$ is set at the calibrating unit 11 and can be regarded, with satisfactory accuracy, as constant, until the application is altered, for example as a result of the fact that another medium of different viscosity occurs, whereupon the above calculation of the true calibrating factor is repeated as above. According to the above example, the calibrating factor is equal to the scale factor since the pick-off 8 is adapted to deliver one pulse per revolution. With several pulses, for example 10-20 pulses per revolution, the scale factor is obtained by division of the calibrating factor by the number of pulses per revolution. The scale factor obtained is then set in the manner described above at the calibrating unit 11, the digital value being set on the one hand, which is seen from the numerical indicators 29 by means of three push-buttons 51 and on the other hand the negative ten-exponent in the form of one digit which is set by means of the adjusting knob 26.

Figure 2:
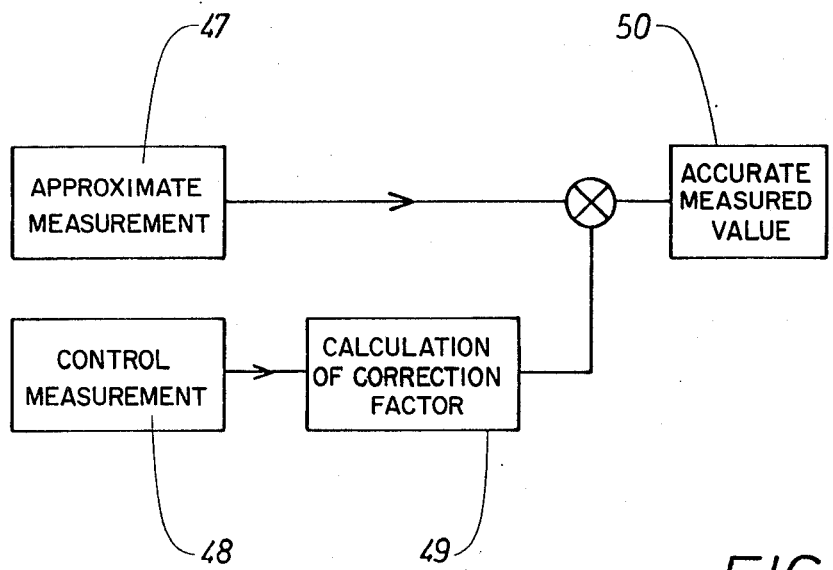
FIG. 2 shows, likewise diagrammatically, the principle on which the present device is based, according to the invention.

FIG. 2 shows the basic principle for the calibration according to the invention. Block 47 refers to the approximate measurement of the amount/flow speed which is obtained direct from the pick-off 8. Block 48 represents the control measurement of the actual amount. This control measurement may be supplemented by a further developed embodiment as discussed in more detail below. Block 49 represents the calculation of the correction factor, while block 50 represents the accurate measured value obtained. This is thus obtained by correction of the approximate measuring result by means of the calculated correction factor.

When the calibration has been carried out as above, the device according to the invention is ready for use. Normally, the portion counter 12 is at zero before the start, otherwise it is set to zero via a reset knob not shown. For portion measurement, the portion required is set by means of the thumb wheel 22, which setting can be seen from the adjusting unit 21, the decimal point, that is to say the negative power of ten, being set by means of the setting knob 26 on the calibrating unit 11. The decimal points for the trip counter 13 and the long-term counter 14, that is to say the required maximum volume, are set by means of the knobs 27 and 28. At the start, the LOAD button 24 is pressed in whereupon the portion counter 12 is charged so that the numerical indicators 42 show the set value in the starting position. At the same time, a signal is given to the electric motor 4 of the pump unit which drives round the pump unit 1, whereupon the actual medium is pumped through the conduit 2 while the portion counter counts down by means of the output signal from the calibrating unit 11. When the portion counter has reached the zero position, the counter stops and gives a stop signal to the electric motor 4 and said magnetically operated valve, whereupon the pumping is interrupted. The pumping can also be interrupted before the zero position is reached by means of a stop member, not shown, in which case the portion counter shows how much remains of the portion which is to be pumped. A new start is effected by means of the LOAD button 24 and the portion measuring continues. The pump motor can also be driven without simultaneous portion measuring, by means of a change-over switch not shown, in which case the portion counter is disconnected. Thus the portion counter shows the pumped amount in cubic decimeters while the trip counter in the example shown shows the amount in cubic meters and thus forms a summation mechanism for the pumped portions and can, if desired, be reset to zero by means of the RESET button 25. As indicated above, the long-term counter shows the sum of the partial measurements effected by the trip counter while at the same time the device for recording the flow speed shows the flow speed on a panel not illustrated.

According to a further developed embodiment, the scale factor is set automatically from a unit which, in real time, calculates the calibrating factor with a starting point from measured relevant parameters such as pressure, temperature, density and the like, and the connection between the parameters and the calibrating factor determined by introductory measurements.

The invention is not restricted to the example of embodiment described above and shown in the drawings but can be varied within the scope of the following Patent Claims. For example, the calibrating unit may be otherwise constructed as can the various meters. For example, said determination of the correction factor $K_K$ and the true calibrating factor $K_V$ can be brought about by means of simple circuits for division and multiplication, in which case, instead of the scale factor, the required amount on the one hand and the true amount on the other hand are set at one unit.

I claim:

1. A device for measuring the amount of flow and/or the speed of flow of a medium pumped by a pump unit, said device comprising: a drive motor for producing the working cycles of the pump unit, a pick-off operatively connected to said motor and pump unit for detecting said working cycles and for delivering a pick-off signal depending on said working cycles, an electronic unit operatively connected to said pick-off for recording, by means of said pick-off signal, a value proportional to the number of working cycles, from which value the amount of flow and/or the speed of flow can be determined by means of a nominal calibrating factor laid down for the pump unit, said electronic unit including a calibrating unit which is adjustable to a set numerical value for conversion of said pick-off signal into at least one output signal which represents a certain true calibrating factor calculated with the aid of a correction factor for the purpose of adapting the pick-off signal by correcting the nominal calibration factor by means of the correction factor, and also including devices for recording the amount and flow speed of the medium, adapted to be controlled by the output signal from the calibrating unit, whereby the pump unit itself with a high accuracy can be utilized for said measuring.

2. A device as claimed in claim 1, wherein said calibrating unit is adapted to deliver a pulse train as an output signal, in which the number of pulses for each pulse in the pick-off signal corresponds to the set numerical value in the calibrating unit.

3. A device as claimed in claim 2, wherein one of the devices for recording is a portion counter which is presettable to a certain portion and adapted to be counted downwards by means of said output signal to zero and then emit a stop signal to the driving motor.

4. A device as claimed in any one of claims 1 to 3, wherein one of the devices for recording is a trip counter which is adapted to record the amount of flow from said output signal and to be reset selectively to zero by means of a reset member.

5. A device as claimed in claim 4, wherein one of the devices for recording is a long-term counter adapted to sum up a plurality of recordings effected by said trip counter of the amount of flow through the pump unit.

6. A device as claimed in claim 1, wherein the calibrating unit includes setting members for setting the decimal point in the respective device for recording.

7. A device as claimed in claim 1, wherein one of the devices for recording is a device for recording the flow speed.

8. A device as claimed in claim 7, wherein the device for recording the flow speed comprises a plurality of counters which are coupled in cascade and which are adapted to count the number of pulses in the pulse train delivered by the calibrating unit, locking circuits each connected to its own counter, numerical indicators each connected to its own locking circuit, and a timer unit adapted to open the locking circuits at regularly recurring intervals, and to set the counters to zero so that the counting information is transferred to the numerical indicators, representing the number of pulses delivered by the calibrating unit per unit of time.

* * * * *